United States Patent
Döring (10) Patent No.: US 8,220,254 B2
(45) Date of Patent: Jul. 17, 2012

(54) METHOD AND ARRANGEMENT FOR IMPROVING THE HYDROLYSIS OF A REDUCTION AGENT IN AN EXHAUST GAS POST TREATMENT SYSTEM

(75) Inventor: Andreas Döring, München (DE)

(73) Assignee: MAN Truck & Bus AG (DE)

( * ) Notice: Subject to any disclaimer, the term of this patent is extended or adjusted under 35 U.S.C. 154(b) by 787 days.

(21) Appl. No.: 12/335,790

(22) Filed: Dec. 16, 2008

(65) Prior Publication Data

US 2009/0151339 A1    Jun. 18, 2009

(30) Foreign Application Priority Data

Dec. 18, 2007 (DE) .......................... 10 2007 061 005

(51) Int. Cl.
*F01N 3/10* (2006.01)
(52) U.S. Cl. .................. 60/301; 60/274; 60/295
(58) Field of Classification Search ...................... 60/301
See application file for complete search history.

(56) References Cited

U.S. PATENT DOCUMENTS

| | | | |
|---|---|---|---|
| 4,884,396 A * | 12/1989 | Miyamoto et al. | 60/39.12 |
| 6,173,568 B1 * | 1/2001 | Zurbig et al. | 60/274 |
| 6,622,480 B2 | 9/2003 | Tashiro et al. | |
| 6,843,966 B1 | 1/2005 | Mahr | |
| 6,928,806 B2 | 8/2005 | Tennison et al. | |
| 6,928,807 B2 | 8/2005 | Jacob et al. | |
| 7,093,427 B2 * | 8/2006 | van Nieuwstadt et al. | 60/286 |
| 2002/0104312 A1 * | 8/2002 | Hoffman et al. | 60/286 |
| 2004/0144337 A1 * | 7/2004 | Wakao et al. | 123/3 |
| 2004/0175305 A1 * | 9/2004 | Nakanishi et al. | 422/186.04 |
| 2006/0010859 A1 * | 1/2006 | Yan et al. | 60/286 |
| 2006/0179822 A1 * | 8/2006 | Dalla Betta | 60/288 |

(Continued)

FOREIGN PATENT DOCUMENTS

DE       40 38 054        6/1992

(Continued)

OTHER PUBLICATIONS

English translation of EP1052009.*

*Primary Examiner* — Thomas Denion
*Assistant Examiner* — Jason Shanske
(74) *Attorney, Agent, or Firm* — Robert Becker; Robert Becker & Associates (57) ABSTRACT

A method and arrangement for improving hydrolysis of a reduction agent in an exhaust gas post treatment system for selective catalytic reduction of $NO_x$ in the exhaust gas of an internal combustion engine operated with excess air. A partial exhaust gas stream is branched off from an exhaust gas stream upstream of an SCR catalytic converter. A hydrolysis catalytic converter is disposed in the partial exhaust gas stream downstream of a metering arrangement for supplying reduction agent thereto. The partial stream is conveyed back to the main stream downstream of the hydrolysis catalytic converter and upstream of the SCR catalytic converter. The temperature at the hydrolysis catalytic converter is maintained within prescribed limits by actively controlling exhaust gas quantity conveyed in the partial stream by entirely or partially blocking the partial stream, via a flow control device, if temperature values at the hydrolysis catalytic converter and the main or partial stream exceed or do not reach specified or threshold values, and/or if certain operating conditions or condition changes of the engine occur.

8 Claims, 2 Drawing Sheets

U.S. PATENT DOCUMENTS

| | | |
|---|---|---|
| 2007/0160508 A1* | 7/2007 | Doumeki et al. ............. 422/168 |
| 2007/0220866 A1* | 9/2007 | Nishiumi .................... 60/286 |
| 2007/0277507 A1* | 12/2007 | Yan ........................ 60/286 |
| 2008/0041050 A1 | 2/2008 | Döring |
| 2008/0041052 A1 | 2/2008 | Döring et al. |
| 2008/0102010 A1* | 5/2008 | Bruck et al. ............... 423/213.2 |

FOREIGN PATENT DOCUMENTS

| | | |
|---|---|---|
| DE | 19913462 | 9/2000 |
| DE | 199 60 976 | 7/2001 |
| DE | 103 23 245 | 12/2004 |
| DE | 102005023398 | 11/2006 |
| EP | 0 341 832 | 11/1989 |
| EP | 1 052 009 | 11/2000 |
| EP | 1 054 722 | 11/2000 |
| EP | 1 072 765 | 1/2001 |
| EP | 1 741 889 | 1/2007 |
| EP | 1892394 | 2/2008 |

* cited by examiner

METHOD AND ARRANGEMENT FOR IMPROVING THE HYDROLYSIS OF A REDUCTION AGENT IN AN EXHAUST GAS POST TREATMENT SYSTEM

The instant application should be granted the priority date of Dec. 18, 2007, the filing date of the corresponding German patent application DE 10 2007 061 005.1.

BACKGROUND OF THE INVENTION

The present invention relates to a method and arrangement for improving the hydrolysis of a reduction agent in an exhaust gas post treatment system of internal combustion engines that are operated with excess air, in particular for the selective catalytic reduction of $NO_x$ in the exhaust gas of such engines.

Limited exhaust gas components, which result during combustion processes, and the permissible emissions of which are continuously being lowered, include, in addition to solid particles, nitrogen oxides. To minimize these exhaust gas components with internal combustion engines operated in motor vehicles, various methods are presently utilized. The reduction of the nitrogen oxides generally occurs with the aid of catalysts, and in oxygen-rich exhaust gas a reduction agent is additionally required in order to increase the selectivity and $NO_x$ conversions. These methods have become known by the collective term SCR processes, whereby SCR stands for "selective catalytic reduction". It has been used for many years in the power plant industry, and in recent times also with internal combustion engines. A detailed illustration of such processes can be found in DE 34 28 232 A1. $V_2O_5$-containing mixed oxides, for example in the form of $V_2O_5/WO_3/TiO_2$, can be used as SCR catalysts. Typical $V_2O_5$ proportions are between 0.2-3%. Iron and copper-containing zeolites can also be used as active materials for SCR catalytic converters.

In practice, ammonia, or compounds that release ammonia, such as urea or ammonium formate, in solid or dissolved form, are used as reduction agents. To convert one mol nitric oxide, one mol ammonia is required.

$$4NO+4NH_3+O_2 \rightarrow 4N_2+6H_2O \quad (1)$$

If a platinum-containing NO-oxidation catalytic converter is disposed upstream of the SCR catalytic converter for the formation of $NO_2$, $$2NO+O_2 \leftrightarrow 2NO_2 \quad (2)$$

the SCR reaction can be considerably accelerated, and the low temperature activity can be significantly raised.

$$NO+2NH_3+NO_2 \rightarrow 2N_2+3H_2O \quad (3)$$

Depending upon the design of the catalytic converters, platinum content, and application, the catalytic converters have start-to-react temperatures between 180° C.-330° C. In this connection, start-to-react temperature means that temperature at which 50% of the nitric oxide oxidizes to nitrogen dioxide.

With internal combustion engines operated in vehicles, the nitrogen oxide reduction with the aid of the SCR process is difficult for the reason that changing operating conditions exist that make the quantitative metering of the reduction agent difficult. Although on the one hand as high a conversion of the nitrogen oxides as possible should be achieved, on the other hand care must be taken that there is no emission of unused ammonia. To prevent this, an ammonia-blocking catalytic converter is frequently disposed downstream of the SCR catalytic converter to convert excess ammonia into nitrogen and water vapor. Particular problems are caused by the so-called cold start, during which the exhaust gas emission must be maintained even after starting of the cold engine, and hence a post treatment system that is not yet operationally warm.

To minimize the solid particles, not only in the power plant industry but also with vehicles, either so-called particle separators or particle filters are used. A typical arrangement having particle separators for use in vehicles is described, for example, in EP 1 072 765 A2. Such arrangements differ from those having particle filters in that the diameter of the channels of the particle separator are considerably greater than the diameter of the largest particle that is present, whereas with particle filters the diameter of the filter channels is in the range of the diameter of the particles. As a consequence of this difference, particle filters are subject to becoming clogged, which increases the exhaust gas counter pressure and reduces the engine power. An arrangement and a method using particle filters instead of a particle separator of the aforementioned type can be found in EP 0 341 832 A2. The aforementioned arrangements or methods are characterized in that the oxidation catalytic converter, which is respectively disposed upstream of the particle separator or particle filter, and which is generally a catalytic converter having platinum as the active material, oxidizes the nitric oxide in the exhaust gas with the aid of the also-contained residual oxygen to nitrogen dioxide, which in turn is converted in the particle separator, or the particle filter, with the carbon particles to CO, $CO_2$, $N_2$ and NO. In this way, at relatively low temperatures, a continuous removal of the accumulated solid particles, $$2NO_2+C \rightarrow 2NO+CO_2 \quad (4)$$

$$NO_2+C \rightarrow NO+CO \quad (5)$$

$$2C+2NO_2 \rightarrow N_2+2CO_2 \quad (6)$$

is effected.

Regeneration cycles, as they must expensively be carried out with other arrangements, in order at relatively high temperatures to oxidize the carbon-containing particles at relatively high temperatures with the aid of oxygen, are thereby eliminated.

In order to fulfill the exhaust gas regulations that will be applicable in the future, it is necessary to simultaneously use not only arrangements for reducing nitrogen oxide emissions, but also arrangements for reducing the emission of solid particles. For this purpose, various arrangements and methods have already become known from DE 103 48 799 A1 and EP 1 054 722 B1.

As already mentioned, in the power plant industry ammonia has proven to be advantageous as a reduction agent for the SCR reaction. However, due to its toxicity, with internal combustion engines operated in vehicles ammonia is replaced by harmless ammonia-releasing compounds such as urea or ammonium formate, in solid or aqueous form. The decomposition of these materials, and hence the release of ammonia, is determinative with SCR methods for the usability of the method.

In conjunction with the decomposition of urea $((NH_2)_2CO)$ into ammonia $(NH_3)$, it is known that this occurs under optimum conditions (temperatures greater than 350° C.) in two stages; according to $$(NH_2)_2CO \rightarrow NH_3+HNCO \quad (7)$$

there is first effected the thermolysis, or pyrolysis, i.e. the thermal decomposition, of urea. Subsequently, according to $$HNCO=H_2O \rightarrow NH_3+CO_2 \quad (8)$$

there is effected a hydrolysis, in other words, the decomposition of isocyanic acid (HNCO) into ammonia (NH$_3$) and carbon dioxide (CO$_2$).

Since with the use of the commercially available 33% aqueous urea solution known as AdBlue the reduction agent is present in a form dissolved in water, this water must be evaporated prior to and during the actual pyrolysis and hydrolysis.

If the temperatures present with the previous reactions according to (7) and (8) are below 350° C., or if heating is accomplished only slowly, it is know from DE 40 38 054 A1 that essentially solid cyanuric acid results from trimerization of the isocyanic acid formed according to reaction (7) pursuant to (9)

and as a consequence thereof ammelide, (10)

Ammeline, (11)

and Melamine, (12)

which lead to clogging of the downstream exhaust gas section. Remedial action can, as outlined in the aforementioned DE 40 38 054, be provided by guiding the exhaust gas stream that is laden with the reduction agent over a urea decomposition and hydrolysis catalytic converter. The exhaust gas temperature from which a quantitative hydrolysis is possible can thus be depressed to 160° C. The construction and composition of an appropriate catalytic converter are also described in the aforementioned publication, as are the construction and function of an SCR catalytic converter system that is equipped with a hydrolysis catalytic converter. TiO$_2$ and/or SiO$_2$ and/or Al$_2$O$_3$ and/or zeolites are used as active components for a urea decomposition and hydrolysis catalytic converter. To reduce the size of the catalytic converters, yet to keep the retention time in the catalytic converters constant, the hydrolysis catalytic converters are often operated in a partial exhaust gas stream which is withdrawn from the main stream, as shown in EP 105 200 9 A1. In this connection, it is particularly advantageous to withdraw the partial exhaust gas stream as close to the engine as possible in order to be able to operate the hydrolysis catalytic converter at a high temperature level. With exhaust gas turbocharged internal combustion engines, it is advantageous to already withdraw the partial exhaust gas stream upstream of the turbocharger and to convey it back again downstream of the turbocharger; appropriate arrangements are described in DE 10206028 A1, DE 19855384 A1 and DE 19960976 A1.

If the hydrolysis catalytic converter is overloaded, for example by being operated at too low of a temperature and/or with high reduction agent metered quantities, no quantitative hydrolysis of the isocyanic acid results. This is particularly problematic with the use of aqueous urea solution, since due to the vaporization of the water additional heat is withdrawn from the exhaust gas and the latter is thus cooled off. In such a case, as described above, thermally very stable by-products such as cyanuric acid, ammelide, ammeline and melamine, are formed. These solid materials accumulate on the hydrolysis catalytic converters, the urea injection nozzles, and the pipes and tubing, which can lead to complete blocking of the exhaust gas stream and the failure of the SCR system. The complete decomposition of these materials takes place only above 450° C.-500° C. However, due to their high efficiency, the exhaust gas temperatures of modern diesel engines is normally below 400° C. The result of this is that deposits that might have formed cannot be again removed without auxiliary measures.

One possibility for raising the exhaust gas temperature to an appropriate level is described in DE 3605255 A1, and comprises adjusting engine parameters, such as the beginning of injection, or lowering the fuel/air ratio.

Furthermore, the proportion of uncombusted hydrocarbons and/or carbon monoxide in the exhaust gas can be increased in order to then oxidize, possibly catalytically, these materials, and hence to increase the exhaust gas temperature. Appropriate arrangements and methods are disclosed in DE 102005023398 A1, DE 10323245 A1, and DE 60210528 T2.

In addition to raising the temperature level by exothermic reactions, it is further known from DE 19960976 A1 to electrically heat the hydrolysis catalytic converters to raise their temperature.

All of the aforementioned variations for raising the temperature have in common that they lead to an increase in fuel consumption and hence to a reduction in the efficiency of the internal combustion engines.

It is therefore an object of the present invention, in addition to avoiding a reduction of the efficiency of an internal combustion engine, to ensure the functionality of a hydrolysis catalytic converter, which is operated in a secondary or by-pass stream of an exhaust gas post treatment system, over a great operating parameter range of the internal combustion engine, and furthermore to reliably prevent problematic deposits, such as cyanuric acid, ammelide, ammeline and melamine, from forming in the secondary exhaust gas stream or downstream thereof.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The object of the present invention is realized by a method and an arrangement for carrying out this method. Pursuant to the method of the present application, a partial exhaust gas stream is first branched off from an exhaust gas stream upstream of an SCR catalytic converter, whereby the partial exhaust gas stream is quantitatively smaller than is the exhaust gas stream; a hydrolysis catalytic converter is disposed in the partial exhaust gas stream downstream of a metering arrangement for supplying a reduction agent to the partial exhaust gas stream; the partial exhaust gas stream is conveyed back to the exhaust gas stream downstream of the hydrolysis catalytic converter and upstream of the SCR catalytic converter; a flow control device is disposed in the partial exhaust gas stream upstream or downstream of the hydrolysis catalytic converter, wherein a degree of opening of the flow control device is adapted to be controlled or regulated; and the temperature at the hydrolysis catalytic converter is maintained within prescribed limits by actively controlling or regulating the quantity of exhaust gas conveyed via the partial exhaust gas stream by entirely or partially blocking or opening the partial exhaust gas stream, via the flow control device, if measured or indirectly determined temperature values at the hydrolysis catalytic converter and in the exhaust gas stream and/or in the partial exhaust gas stream exceed or do not reach specified threshold values, and/or if certain operating conditions and/or operating condition changes of the internal combustion engine occur.

The present invention proceeds from the consideration of advantageously maintaining the temperature at the hydrolysis catalytic converter within prescribed limits by an active control or regulation of the exhaust gas quantity conveyed over the partial exhaust gas stream, and to thus avoid cooling of the hydrolysis catalytic converter without influencing the efficiency of the internal combustion engine. For this purpose, by means of a flow control device that is disposed upstream or downstream of the hydrolysis catalytic converter and which can be controlled or regulated, the partial exhaust gas stream is entirely or partially blocked or opened if measured or indirectly determined temperature threshold values at the hydrolysis catalytic converter are exceeded or not reached, or if certain operating conditions of the internal combustion engine occur.

For example, at a low temperature of the hydrolysis catalytic converter, and the presence of a high exhaust gas temperature upstream of the hydrolysis catalytic converter, and/or at operating parameters of the internal combustion engine that lead to such a high exhaust gas temperature, the exhaust gas quantity is increased by opening the flow control device in order to effect an advantageous heating up of the hydrolysis catalytic converter. At a low temperature at the hydrolysis catalytic converter, and/or the presence of a low exhaust gas temperature, and/or operating parameters of the internal combustion engine that lead to a low exhaust gas temperature, the exhaust gas quantity, by means of a partial closing of the flow control device, is reduced to such an extent that the reduction agent quantity that is to be supplied still makes it possible to ensure a proper receipt of the reduction agent into the partial exhaust gas stream. This advantageously prevents a cooling off of the hydrolysis catalytic converter.

Furthermore, to prevent a further cooling off of a hydrolysis catalytic converter, it is advantageous when the temperature drops below a first temperature threshold value at the hydrolysis catalytic converter, in addition to the partial shutting off of the partial exhaust gas stream, to control the metering arrangement in such a way that the supply of reduction agent is reduced or eliminated. This takes place independently of the actual need for the complete reduction of the nitrogen oxides.

When the temperature drops below a lower temperature threshold at the hydrolysis catalytic converter, and simultaneously with the presence of an exhaust gas temperature below a prescribed threshold, it is advantageous to entirely close the flow control device and to eliminate the supply of reduction agent via the metering arrangement.

When the flow control device is closed, and the supply of reduction agent is eliminated, and if the exhaust gas temperature increases to a value above a prescribed threshold value, and/or operating parameters of the internal combustion engine are present that lead to such an increase of the exhaust gas temperature, the flow control device is opened and the supply of reduction agent is released via the metering arrangement, so that the hydrolysis catalytic converter is heated up.

If the temperature exceeds a predetermined upper temperature threshold at the hydrolysis catalytic converter, by means of the at least partial closing of the flow control device the exhaust gas quantity conveyed via the partial exhaust gas stream can be reduced to such an extent that a further increase in temperature at the hydrolysis catalytic converter is prevented, as a result of which a thermal damage of the hydrolysis catalytic converter can advantageously be counteracted.

With the methods of proceeding described above, exhaust gas temperatures, and the temperatures at the hydrolysis catalytic converter, can advantageously be determined metrologically directly via temperature sensors. Of course, it would also be possible to indirectly determine, for example, the temperature at the hydrolysis catalytic converter, by means of two temperature sensors to determine the exhaust gas temperature upstream and downstream of the hydrolysis catalytic converter, whereby in this case the reduction agent quantity supplied by the metering arrangement, or the reduction agent temperature, can also be taken into consideration.

There is a further possibility of determining the temperature of the hydrolysis catalytic converter as well as the exhaust gas temperature by means of models, whereby the temperature curves at the hydrolysis catalytic converter are determined at a reference internal combustion engine as a function of operating parameters of the internal combustion engine, such as fuel injection quantity and/or exhaust gas pressure and/or intake pressure and/or the oil temperature and/or engine coolant temperature and/or surrounding temperature and/or engine speed and/or metering quantity for the reduction agent, and are stored in a control unit of the internal combustion engine in the form of characteristic curves, performance characteristics, functions or neuronal networks. When certain operating parameters or their periodic sequences are present, it is then possible, with the aid of the characteristic curves or the performance characteristics, to deduce or conclude upon the temperature of the hydrolysis catalytic converter or the exhaust gas temperatures upstream or downstream of the hydrolysis catalytic converter.

Pursuant to an advantageous arrangement for carrying out the method of the present invention, a flow control device is provided in the partial exhaust gas stream, whereby the flow control device is adapted to be operated by means of a drive mechanism that can be acted upon by a control unit via a control signal. In this connection, the control signal is advantageously formed by the control unit as a function of at least one first signal value, which corresponds to at least one prescribed temperature value at the hydrolysis catalytic converter, and/or at least one second signal value, which corresponds to at least one prescribed temperature value in the exhaust gas stream or the partial exhaust gas stream upstream of the hydrolysis catalytic converter, and/or of at least one third signal value, which corresponds to at least one prescribed value of at least one operating parameter of the internal combustion engine.

To generate the control signal it is advantageous, by means of the control unit, to detect and logically interconnect or combine sensor signals that are obtained as a function of the gas pedal position and/or of the fuel injection quantity and/or of the exhaust gas pressure and/or of the intake pressure and/or of the oil temperature and/or of the engine coolant temperature and/or of the surrounding temperature and/or of the engine speed and/or of the metered quantity for the reduction agent and/or of the exhaust gas temperatures and/or of the temperature of the hydrolysis catalytic converter.

The supply of the reduction agent to the partial exhaust gas stream can be effected downstream or also upstream of the flow control device. A supply upstream of the flow control device is preferred, since the gas temperature decreases due to the expansion via the flow control device.

Titanium and/or silicon and/or vanadium and/or tungsten and/or their oxides and/or zeolites are possible active components for the hydrolysis catalytic converter.

The catalytic converters for the reduction of nitrogen oxides with the aid of ammonia can contain vanadium and/or vanadium pentoxide and/or titanium dioxide and/or tungsten oxide and/or copper-containing zeolites and/or iron-containing zeolites and/or cobalt-containing zeolites as active components.

Furthermore, a second SCR catalytic converter can be disposed in the partial exhaust gas stream and still upstream of where it is conveyed back into the main stream.

The partial exhaust gas stream can be withdrawn from the exhaust gas stream upstream of an exhaust gas turbine of an exhaust gas turbocharger in order to advantageously obtain as high a temperature level in the partial exhaust gas stream as possible.

To accelerate the SCR reaction, platinum metal containing catalytic converters can be disposed in the partial exhaust gas stream and/or in the exhaust gas stream for the formation of $NO_2$.

Pursuant to a further possible arrangement, a device for the separation of particles can be provided downstream of where the reduction agent is supplied so that in addition the particle emissions can be reduced. This device can be disposed upstream or downstream of the SCR catalytic converter.

To advantageously increase the $NO_x$ conversion, the hydrolysis catalytic converter can be embodied in such a way that it is also provided with reduction activity for nitrogen oxides with the aid of ammonia.

The flow control device can be embodied as a choke or pivotable closure means, a slide valve, a needle valve, a ball valve, a poppet valve, or a disk valve. It can be activated electrically, pneumatically or hydraulically.

Further specific features of the present invention will be described subsequently.

DESCRIPTION OF SPECIFIC EMBODIMENTS

Figure 1:
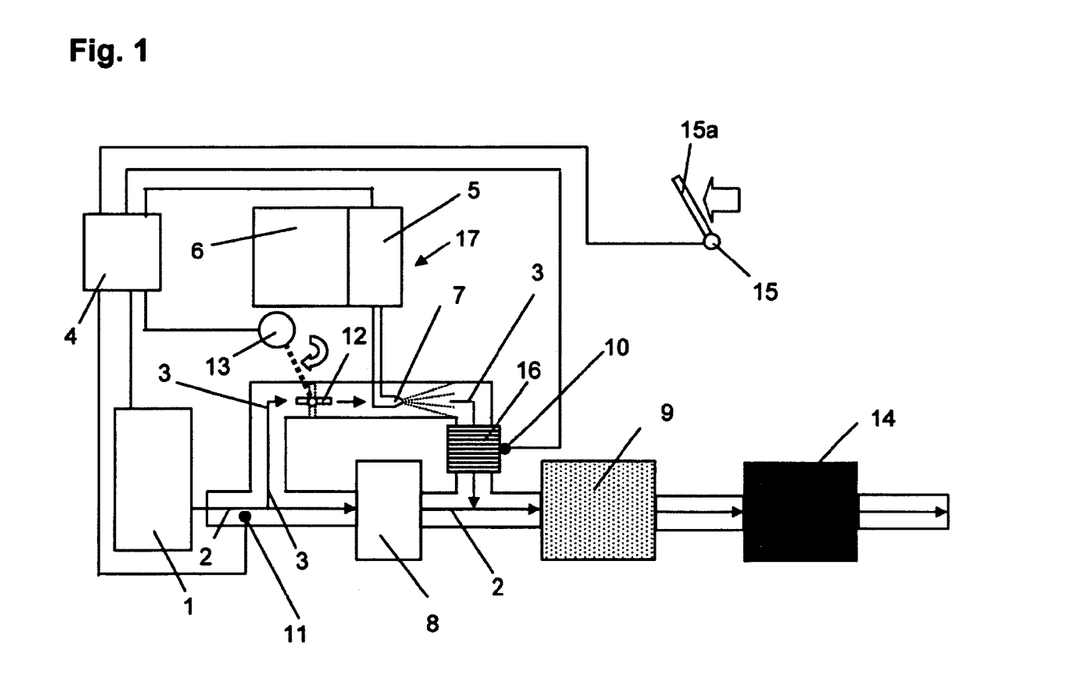
FIG. 1 shows one exemplary inventive arrangement for improving the partial stream hydrolysis.

Referring now to the drawings in detail, schematically illustrated in FIG. 1 is an exhaust gas post treatment system that operates in a commercial vehicle and has partial stream hydrolysis and integrated engine air brake. The exhaust gases that are generated by an internal combustion engine 1 by the combustion processes, and which are symbolized by arrows in all of the figures, first pass into the exhaust gas section as the exhaust gas stream 2. A partial exhaust gas stream 3 branches off from the exhaust gas stream 2; a reduction agent is added to the hot exhaust gas in the partial exhaust gas stream 3 as close to the engine as possible. The reduction agent, as it is conventional with motor vehicles having SCR catalytic converters, is an aqueous urea solution; it is, of course, also conceivable to add urea in solid form, as is already described in detail in the pertinent technical literature. The metering of the reduction agent is effected by a metering device 5, which is controlled by an electronic control unit 4 as a function of operating parameters of the internal combustion engine 1. The metering device 5 withdraws the aqueous urea solution from a supply tank 6 and via a nozzle 7 sprays prescribed quantities of it into the partial exhaust gas stream 3 depending upon the operating state of the internal combustion engine 1. The metering device 5, supply tank 6, and nozzle 7 form the metering arrangement 17. In the hot exhaust gas, in the case of an aqueous urea solution, the water portion must vaporize, and the urea must be converted into ammonia ($NH_3$) and carbon dioxide ($CO_2$) pursuant to the aforementioned reactions designated as (7) and (8). Without additional auxiliary means, at exhaust gas temperatures that are too low (<350° C.) this would take place only incompletely, and instead, pursuant to reaction (9), cyanuric acid and in slight quantities ammelide, ammeline, and melamine result. To prevent this to a large extent, a hydrolysis catalytic converter 16 is disposed downstream of the position of addition for the reduction agent, and upstream of the return of the partial exhaust gas stream 3 into the exhaust gas stream 2, as a result of which the critical exhaust gas temperature, beyond which the aforementioned problematic decomposition products of the urea result, is reduced to about 160° C.

Parallel to the position of addition of the reduction agent, an oxidation catalytic converter 8 is disposed in the exhaust gas stream 2, the task of which, pursuant to the reaction previously designated as (2), is to oxidize a portion of the nitric oxide contained in the exhaust gas into nitrogen dioxide by means of the excess oxygen present in the exhaust gas. Downstream of the oxidation catalytic converter 8, the partial exhaust gas stream 3, which is charged with the reduction agent, is again discharged into the exhaust gas stream 2.

The actual selective catalytic reduction of the nitrogen oxides is effected downstream of where the partial exhaust gas stream 3 is discharged into the exhaust gas stream 2 by means of an SCR catalytic converter 9, which is to convert as large a proportion as possible of the nitrogen oxides ($NO_x$) present in the exhaust gas into nitrogen and water vapor, with simultaneous high selectivity of the reduction, without excess ammonia ($NH_3$) remaining in the exhaust gas stream. If this does not take place entirely due to a faulty metering of the reduction agent, for example at highly dynamic load changes, excess ammonia thus remains in the exhaust gas stream downstream of the SCR catalytic converter 9, and is converted into nitrogen and water vapor by an $NH_3$-oxidation catalytic converter 14 that is disposed downstream of the SCR catalytic converter 9.

For the partial or complete shutting off of the partial exhaust gas stream 3, a flow control device 12 in the form of a choke or pivotable closure means is disposed upstream of the location where the reduction agent is added and downstream of where the partial exhaust gas stream 3 branches off. Since the flow control device 12 of course need not be embodied only as a choke, but rather can be embodied in many different ways, for example as a slide valve, needle valve, ball valve, poppet valve, or disk valve, just to name a few possibilities, in the following the general term flow control device will be utilized. For the closing or opening of the flow control device 12, a drive mechanism 13 is provided that on the one hand acts on the flow control device and is controlled by a control unit 4. The drive mechanism 13 can be an electric, hydraulic or pneumatic drive mechanism; such drive mechanisms are known in conjunction with the aforementioned different types of flow control devices.

To detect the temperature of the hydrolysis catalytic converter 16, a first temperature sensor 10 is disposed thereon; the temperature of the exhaust gas stream 2 is detected with the aid of a second temperature sensor 11, which is disposed in the exhaust gas stream 2 upstream of where the partial exhaust gas stream 3 branches off therefrom.

To detect a high load, or a sudden positive or negative load change, a gas pedal sensor 15, which detects the position of the gas pedal 15a, is provided and is connected with the electronic control unit 4.

The inventive method provides that the quantity of exhaust gas that is conveyed via the partial exhaust gas stream is controlled, as a function of the temperature present at the hydrolysis catalytic converter 16, the exhaust gas temperature, and/or at least one operating parameter, in such a way that the temperature is prevented from dropping below the temperature threshold of, for example, 160° C. To achieve this, the temperature that is present at the hydrolysis catalytic converter 16 is detected by means of the first temperature sensor 10, and is compared by the control unit 4 with first threshold temperature values, which are stored in the control unit, in order to obtain a first signal. In addition, the exhaust gas temperature is detected by the second temperature sensor 11, and is compared by the control unit 4 with second threshold temperature values, which are stored in the control unit, in order to obtain a second signal. If the first signal indicates a low temperature at the hydrolysis catalytic converter 16, and the second signal indicates a high exhaust gas temperature upstream of the hydrolysis catalytic converter 16, the control unit 4 generates a control signal for the drive mechanism 13 of the flow control device 12 such that the flow control device opens. Due to the opening of the flow control device 12, the hydrolysis catalytic converter 16 is heated up. A limiting of the upper temperature of the hydrolysis catalytic converter is expedient if $TiO_2$ in its anatase form is used as the active component of the hydrolysis catalytic converter 16. If in such a case the catalytic converter temperature exceeds 600° C., a conversion of anatase into rutile occurs and as a consequence thereof a decline of the activity of the hydrolysis catalytic converter occurs. In addition, an oxidation of the reduction agent can occur. In order to avoid this, when a predetermined upper temperature threshold at the hydrolysis catalytic converter 16 is exceeded, in other words, when the first signal indicates a temperature at the hydrolysis catalytic converter 16 that is too high, the control unit 4 generates a control signal for the drive mechanism 13 of the flow control device 12 such that the flow control device closes partially, so that the quantity of exhaust gas that is conveyed via the partial exhaust gas stream 3 is reduced. In this way, a further increase of the temperature at the hydrolysis catalytic converter 16 is avoided.

If in contrast, in the previously described manner, a low temperature is detected at the hydrolysis catalytic converter 16 and/or the presence of a low exhaust gas temperature is detected, then by means of the control unit 4 and the drive mechanism 13 the flow control device 12 is closed entirely or partially in order to prevent a cooling of the hydrolysis catalytic converter 16. At the same time, independently of the actual reduction agent requirement, the reduction agent feed can be partially or entirely eliminated by an appropriate control of the metering device 5.

If the temperature drops below a lower temperature threshold at the hydrolysis catalytic converter 16, and with the simultaneous presence of an exhaust gas temperature below a prescribed threshold value, which exhaust gas temperatures is detected by the second temperature sensor 11 and evaluated by the control unit 4, the flow control device 12 is entirely closed and the supply of reduction agent is eliminated via the control unit 4 and the metering device 5 controlled thereby. Thus, further cooling of the hydrolysis catalytic converter is limited to a minimum.

If when the flow control device 12 is closed and the supply of reduction is eliminated the control unit 4, by appropriate evaluation of the signal of the second temperature sensor 11, determines that the exhaust gas temperature have risen to a value above a prescribed threshold value, the flow control device 12 is opened by an appropriate control of the drive mechanism 13 via the control unit 4 and the supply of reduction agent is again released by an appropriate control of the metering device 5.

When a sudden change of load occurs, to overcome inertia or time lag of the previously described control process, sudden positive and negative load changes are detected by the control unit 4 as a function of the periodic evaluation of the position of the gas pedal 15a by means of a gas pedal sensor 15, which signals the gas pedal position. If the sudden load change that is determined is a positive load change, in general the flow control device 12 is opened by appropriate control of the drive mechanism 13 via the control unit 4, because due to the higher load the exhaust gas temperature would rise sharply, and this rapid increase, if the flow control device 12 were open, would lead to the rapid heating of the hydrolysis catalytic converter 16. On the other hand, if the sudden load change is negative, and the temperature at the hydrolysis catalytic converter is low, by means of the control unit 4 and the drive mechanism 13 the flow control device 12 is at least partially closed in order to prevent an accelerated cooling of the hydrolysis catalytic converter 16.

Sudden load changes can, of course, also be detected by evaluating other influencing factors than the position of the gas pedal. For example, the evaluation of the fuel injection quantity or of the intake pressure via the control unit 4 could be used to determine sudden load changes.

Of course, other operating parameters that influence the exhaust gas temperature could also be evaluated by the control unit 4 and utilized for establishing the control of the drive mechanism 13 of the flow control device 12. Such operating parameters are, for example, the fuel injection quantity and/or the exhaust gas pressure and/or the intake pressure and/or the oil temperature and/or the engine coolant temperature and/or the surrounding temperature and/or the engine speed and/or the metering quantity for the reduction agent. The periodic change of these parameters can also be taken into account for the control of the drive mechanism 13 of the flow control device 12.

With internal combustion engines that are installed in vehicles, and that have an engine brake, (not illustrated in the figures), a brief heating up of the hydrolysis catalytic converter due to exploitation of the engine brake state is possible. I for this reason, the operating state "engine brake active" is detected by the control unit. F an engine braking process exists, the control valve or flow control device remains at least partially opened, with interrupted supply of reduction agent as well as interrupted fuel injection. The exhaust gas, which is compressed by the compression action of the internal combustion engine, is, in the exhaust stroke, respectively pressed into the partial exhaust gas stream that branches off from the exhaust gas stream, so that the temperature of the partial exhaust gas stream rises sharply. The possibility of heating up the hydrolysis catalytic converter by engine braking processes is independent of the type of engine brake utilized. Not only with a decompression brake, as described in CH 429298 A, with an engine air brake, as disclosed in DE 966212 B, or with a combination of the two engine brake types, as disclosed in DE 3904497 C1, can this manner of proceeding be utilized. With the two last-mentioned types of engine brakes, the engine brake valve (not illustrated in the figures) is disposed in the exhaust gas stream parallel the partial exhaust gas stream, and the flow control device in the partial exhaust gas stream is opened only slightly in order not to affect the engine braking effect.

Instead of the above-described metrological determination of the exhaust gas temperature via the second temperature sensor 11, or the temperature of the hydrolysis catalytic converter 16 via the first temperature sensor 10, it is, of course, possible to undertake an indirect determination of these temperatures; for this purpose, one utilizes so called "models".

With such models, characteristic values, performance character values, mathematical functions or neuronal networks, which represent temperature curves at the hydrolysis catalytic converter and/or exhaust gas temperatures, are stored in the control unit of the internal combustion engine. In this connection, at the start, the characterizing values, performance characteristic values, functional values or values from neuronal networks are determined with a reference internal combustion engine, as a function of operating parameters of the internal combustion engine, such as fuel injection quantity and/or exhaust gas pressure and/or intake pressure and/or oil temperature and/or engine coolant temperature and/or surrounding temperature and/or engine speed and/or metering quantity for the reduction agent. In order to now determine the temperatures in the exhaust gas section or at the hydrolysis catalytic converter, the temperature of the hydrolysis catalytic converter and/or the exhaust gas temperatures upstream and/or downstream of the hydrolysis catalytic converter can be determined indirectly via the operating parameters detected by the control unit 4, and/or the periodic sequence thereof and/or the logical interconnection thereof, with the aid of the stored characterizing or performance characteristic values.

Figure 2:
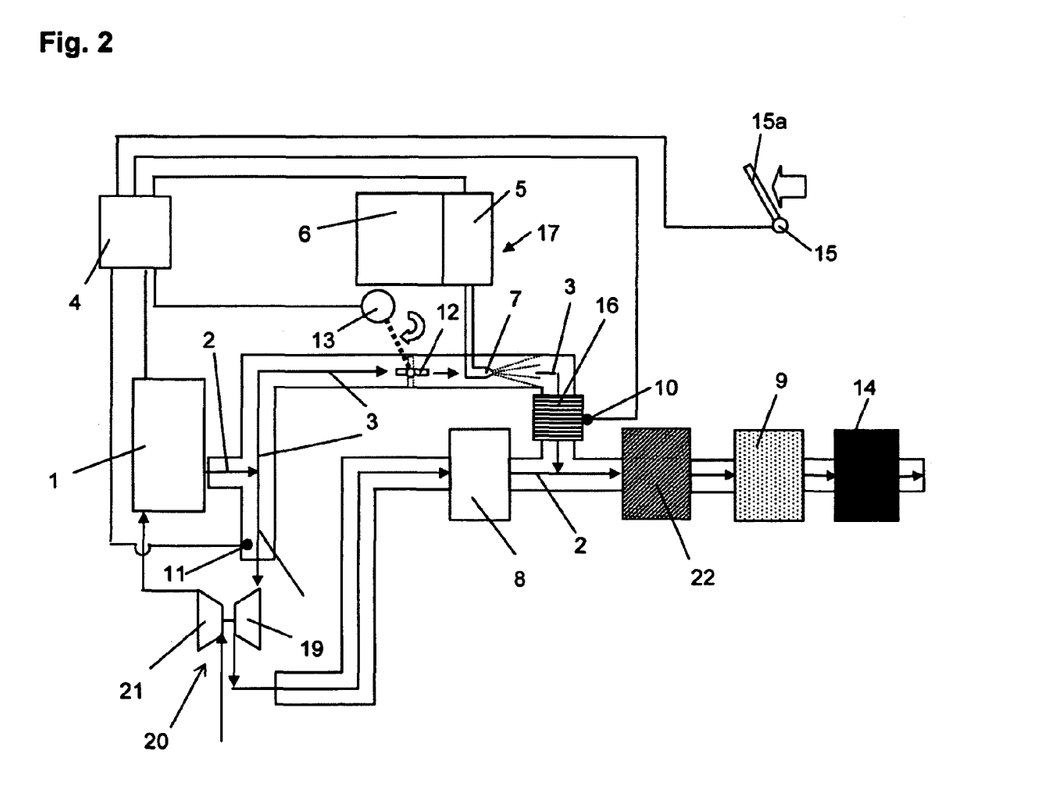
FIG. 2 shows a further exemplary inventive arrangement for improving the partial stream hydrolysis for internal combustion engines having a turbocharger.

With internal combustion engines used in vehicles these days, frequently an at least single stage turbocharger is present that with the aid of the exhaust gas enthalpy contained in the exhaust gas stream compresses the combustion air that is supplied to the internal combustion engine. This presents problems for the exhaust gas post treatment for the reason that the exhaust gas that flows over the turbines of the exhaust gas turbocharger or turbochargers is inherently greatly cooled off thereby. An exhaust gas stream that is cooled off in this manner is in particular in the start-up operation and in the lower partial throttle range not in a position to achieve adequate exhaust gas temperatures for the hydrolysis of the reduction agent. Even if hydrolysis catalytic converters are utilized, the temperature level is generally not sufficient. The arrangement shown in FIG. 2 provides relief for this problem. The arrangement shown in FIG. 2 differs from that of FIG. 1 in that the turbine 19 of a turbocharger 20 is disposed downstream of where the partial exhaust gas stream 3 branches off from the exhaust gas stream 2, and upstream of the oxidation catalytic converter 8. The exhaust gas stream 2 that is coming from the internal combustion engine 1 thus already branches off into the partial exhaust gas stream 3 prior to the turbine 19 of the exhaust gas turbocharger 20, while the remaining exhaust gas is conveyed over the turbine 19, by means of which it drives the compressor 21, and is then conveyed to the downstream oxidation catalytic converter 8. Due to this arrangement of the turbine 19, the temperature level in the partial exhaust gas stream 3 remains high, since no cooling off is effected by the turbine 19.

The aforementioned additional components in the embodiment of FIG. 2 do not alter the manner in which the arrangement functions relative to the manner of functioning described in conjunction with the embodiment of FIG. 1, which is made clear by the retention of the reference numerals. In order to avoid repetition, reference is made to the description of the embodiment of FIG. 1 with respect to the arrangement of the remaining components, and in particular with regard to the description of the function.

It is to be understood that the previously described arrangements of FIGS. 1 and 2 can also be combined with a particle separator or a particle filter, as shown explicitly in the embodiment of FIG. 2. There, a particle separator 22 is disposed in the exhaust gas stream 2 downstream of where the partial exhaust gas stream 3 and the exhaust gas stream 2 are joined back together, and upstream of the SCR catalytic converter 9; the particle separator 22 accumulates the carbon particles found in the exhaust gas. The elimination of the accumulated carbon particles is effected continuously with the aid of the $NO_2$ produced in the oxidation catalytic converter 8 pursuant to reaction (2) from NO and the residual oxygen contained in the exhaust gas; the $NO_2$ oxidizes the carbon particles, pursuant to the equations or reactions (4), (5) and (6), to CO or $CO_2$. The arrangement of the particle separator or particle filter can also be effected at some other location than that described above, not only upstream but also downstream of the SCR catalytic converter.

The previously described embodiments can, of course, be realized in many ways by one of skill in the art without straying from the basic inventive concept; thus the embodiments described are provided by way of example only.

The specification incorporates by reference the disclosure of German priority document DE 10 2007 061 005.1 filed Dec. 18, 2007.

The present invention is, of course, in no way restricted to the specific disclosure of the specification and drawings, but also encompasses any modifications within the scope of the appended claims.

What I claim is:

1. A method of improving the hydrolysis of a reduction agent in an exhaust gas post treatment system for the selective catalytic reduction of NOx in the exhaust gas of an internal combustion engine (1) that is operated with excess air, including the steps of:

providing an SCR catalytic converter (9);

upstream of said SCR catalytic converter (9), branching off from an exhaust gas stream (2) a partial exhaust gas stream (3) that is quantitatively smaller than said exhaust gas stream (2);

disposing in said partial exhaust gas stream (3) a metering arrangement (17) for supplying a reduction agent to said partial exhaust gas stream (3);

disposing a hydrolysis catalytic converter (16) in said partial exhaust gas stream (3) downstream of said metering arrangement (17);

conveying said partial exhaust gas stream (3) back to said exhaust gas stream (2) downstream of said hydrolysis catalytic converter (16) and upstream of said SCR catalytic converter (91);

disposing a flow control device (12) in said partial exhaust gas stream (3) upstream or downstream of said hydrolysis catalytic converter (16), wherein a degree of opening of said flow control device (12) is adapted to be controlled or regulated;

maintaining the temperature at said hydrolysis catalytic converter (16) within prescribed limits by actively controlling or regulating the quantity of exhaust gas conveyed via said partial exhaust gas stream (3) by entirely or partially blocking or opening said partial exhaust gas stream (3): via said flow control device (12), if measured or indirectly determined temperature values at said hydrolysis catalytic converter (16) and in said exhaust gas stream (2) and/or in said partial exhaust gas stream exceed or do not reach specified threshold values, and/or if certain operating conditions and/or operating condition changes of the internal combustion engine (1)

occur;

increasing the quantity of exhaust gas conveyed via said partial exhaust gas stream (3) by opening said flow control device (12) at a low temperature of said hydrolysis catalytic converter (16) and in the presence of a high temperature exhaust gas stream upstream of said hydrolysis catalytic converter (16), and/or at operating parameters and/or operating parameter changes of the internal combustion engine (1 that lead to such a high exhaust gas temperature, in order to effect heating up of said hydrolysis catalytic converter (16); and at a low temperature at said hydrolysis catalytic converter (16) and with the presence of a low exhaust gas temperature and/or operating parameters and/or operating parameter changes of the internal combustion engine (1) that lead to a low exhaust gas temperature, the exhaust gas quantity conveyed via the partial exhaust gas stream (3), by means of a partial closing of said flow control device (12), is reduced to such an extent that the reduction agent quantity that is to be supplied still makes it possible to ensure a proper receipt of the reduction agent into said partial exhaust gas stream (3).

2. A method according to claim 1, which, when the temperature at said hydrolysis catalytic converter (16) drops below a first predetermined temperature threshold value at said hydrolysis catalytic converter, includes the steps of partially shutting off said partial exhaust gas stream (3) and, via appropriate activation of said metering arrangement (17), reducing or eliminating the supply of the reduction agent, independently of an actual requirement for complete reduction of the nitrogen oxides.

3. A method according to claim 1, which, when the temperature at said hydrolysis catalytic converter (16) drops below a predetermined lower temperature threshold, and with the simultaneous presence of an exhaust gas temperature below a prescribed threshold value, includes the further steps of entirely closing said flow control device (12) and eliminating the supply of reduction agent via said metering arrangement (17).

4. A method according to claim 1, which, upon a closing of said flow control device (12) and an elimination of the supply of reduction agent, and if the exhaust gas temperatures increase to a value above a prescribed threshold value, and/or operating parameters and/or operating parameter changes of the internal combustion engine (1) are present that lead to such an increase of the exhaust gas temperature, includes the further steps of opening said control flow device (12) and releasing a supply of reduction agent via said metering arrangement (17).

5. A method according to claim 1, which, if the temperature of the hydrolysis catalytic converter exceeds a prescribed upper temperature threshold, includes the further step, by at least partially closing said flow control device (12), of reducing the exhaust gas quantity conveyed via the partial exhaust gas stream (3) to such an extent that any further temperature increase at said hydrolysis catalytic converter (16) is avoided.

6. A method according to claim 1, which includes the step of metrologically determining the temperature at said hydrolysis catalytic converter (16) directly via a temperature sensor provided at said hydrolysis catalytic converter.

7. A method according to claim 1, which includes the step of determining the temperature at said hydrolysis catalytic converter (16) indirectly by means of two temperature sensors for determining the exhaust gas temperature upstream and downstream of said hydrolysis catalytic converter.

8. A method according to claim 1, which includes the further steps of:

determining the temperature at said hydrolysis catalytic converter (16) and/or the exhaust gas temperature via a model, wherein said model is comprised of characterizing values, performance characteristic values, mathematical functions, or neuronal networks, which are stored in a control unit of the internal combustion engine (1) and that represent the temperature curves at the hydrolysis catalytic converter (16) and/or exhaust gas temperatures, and wherein the temperature curves are determined at a reference internal combustion engine as a function of operating parameters of the internal combustion engine (1), such as fuel injection quantity and/or exhaust gas pressure and/or intake pressure and/or oil temperature and/or engine coolant temperature and/or surrounding temperature and/or engine speed and/or metering quantity for the reduction agent; and if certain operating parameters of the internal combustion engine (1) and/or their periodic sequence are present, indirectly determining the temperature of said hydrolysis catalytic converter (16) and/or the exhaust gas temperatures upstream and/or downstream of said hydrolysis catalytic converter (16) by a logical operation undertaken with the stored characterizing values or performance characteristic values or mathematical functions or neuronal networks.

* * * * *